(12) United States Patent
Dichter

(10) Patent No.: US 6,847,364 B1
(45) Date of Patent: Jan. 25, 2005

(54) METHODS AND APPARATUS FOR CREATING THREE-DIMENSIONAL MOTION ILLUSION IN A GRAPHICS PROCESSING SYSTEM

(75) Inventor: Carl R. Dichter, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/471,984

(22) Filed: Dec. 23, 1999

(51) Int. Cl.[7] ............................................... G06T 15/00
(52) U.S. Cl. ...................................................... 345/473
(58) Field of Search ............................... 345/473, 474, 345/475, 581, 582, 588, 629, 630, 631

(56) References Cited

U.S. PATENT DOCUMENTS

| | | | |
|---|---|---|---|
| 5,613,048 A | | 3/1997 | Chen et al. ................. 395/119 |
| 5,731,819 A | | 3/1998 | Gagne et al. ............... 345/433 |
| 5,926,190 A | | 7/1999 | Turkowski et al. ......... 345/473 |
| 5,933,150 A | | 8/1999 | Ngo et al. .................. 345/473 |
| 6,128,018 A | * | 10/2000 | Nakajima ................... 345/419 |
| 6,147,692 A | * | 11/2000 | Shaw et al. ................. 345/433 |
| 6,234,901 B1 | * | 5/2001 | Nagoshi et al. ............. 463/33 |
| 6,288,722 B1 | * | 9/2001 | Narayanaswami .......... 345/433 |

FOREIGN PATENT DOCUMENTS

EP    0583060    2/1994

OTHER PUBLICATIONS

Ahn et al. "Approximate General Sweep Boundary of a 2D Curved Object" Mar. 1993, Graphics Model and Image processing, pp. 98–128.*

* cited by examiner

*Primary Examiner*—Phu K. Nguyen
(74) *Attorney, Agent, or Firm*—Schwegman, Lundberg, Woessner & Kluth, P.A.

(57) ABSTRACT

A data processing system provides high performance three-dimensional graphics. In one embodiment a processor of the data processing system performs a computer algorithm that creates a motion illusion regarding an object being displayed in a computer graphics scene by drawing multiple images of the object and varying the application of an attribute, such as transparency, color, intensity, reflectivity, fill, texture, size, and/or position including depth, to the images in a manner that provides the object with an illusion of three-dimensional motion between a first position and a second position. Also described are an integrated circuit for implementing the motion illusion algorithm and a computer-readable medium storing a data structure for implementing the motion illusion algorithm.

36 Claims, 4 Drawing Sheets

US 6,847,364 B1

METHODS AND APPARATUS FOR CREATING THREE-DIMENSIONAL MOTION ILLUSION IN A GRAPHICS PROCESSING SYSTEM

TECHNICAL FIELD

The inventive subject matter relates to computer graphics and, in particular, to creating motion illusion of objects in a three-dimensional graphics system.

BACKGROUND INFORMATION

In the field of data processing, there is an ever increasing demand for graphics applications which are faster, more detailed, and generally more lifelike than their predecessors. Many of these applications are useful in personal, educational, military, and commercial data processing systems. In addition, the rapid acceleration of Internet applications is mandating high performance graphics and multimedia features in newly released computer systems.

High speed three-dimensional (3D) graphics processing requires fast, pipe-lined processing in order to provide realistic geometric detail and to "light" objects in a scene with special attributes such as transparency, depth, color, intensity, reflectivity, fill, texture, and so forth. Newer microprocessors, such as the Pentium® III processor, commercially available from Intel Corporation of Santa Clara, Calif., that provide streaming single-instruction-multiple-data (SIMD) instructions for floating-point data as part of their instruction sets, are particularly well adapted to implement high speed 3D graphics.

Graphics processing architectures must support both the intense computational workload required for geometric transformations and lighting, as well as the increasingly high bus bandwidth load required to access data and instructions from memory to support these computations. To be commercially successful, processors used in personal computers must be able to fulfill these computational and bandwidth requirements while keeping the hardware cost very low.

High output bandwidth has until now implied high cost memory for storing the large amounts of data required to implement high-speed 3D graphics features, such as realistically rendering moving objects within a scene on a computer screen.

For the reasons stated above, there is a substantial need in the area of computer graphics processing to provide a graphics processing system which can realistically render scenes involving moving objects while minimizing computational and bandwidth loads and memory resources.

In addition, there is a substantial need in the area of computer graphics processing to provide a computer-based method of effectively creating a motion illusion of one or more objects being displayed in a computer graphics scene.

DETAILED DESCRIPTION

In the following detailed description, reference is made to the accompanying drawings which form a part hereof, and in which is shown by way of illustration specific embodiments in which the inventive subject matter may be practiced. Other embodiments may be utilized and structural changes may be made without departing from the scope of the inventive subject matter.

Figure 1:
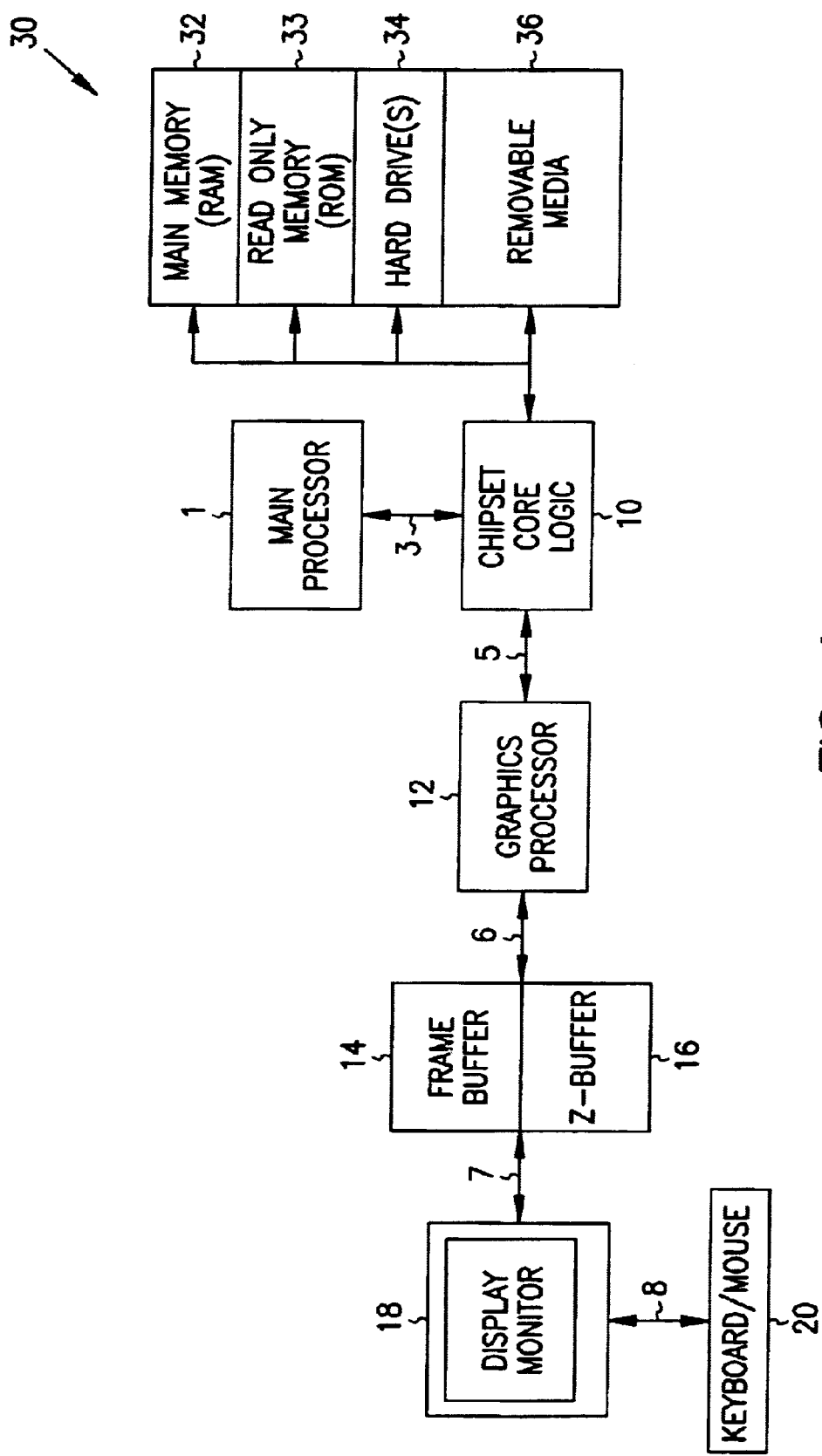
FIG. 1 illustrates a block diagram of a data processing system with which one embodiment of the inventive subject matter can be implemented.

FIG. 1 illustrates a block diagram of a data processing system with which one embodiment of the inventive subject matter can be implemented. The data processing system shown in FIG. 1 is capable of performing high performance 3D graphics processing. In one embodiment, the system comprises a main processor 1, chipset core logic 10, graphics processor 12, frame buffer 14, Z-buffer 16, display monitor or computer screen 18, keyboard/mouse 20, and memory 30. Memory 30 can comprise any suitable memory storage devices and in one embodiment includes main memory 32 implemented with random access memory (RAM) chips, read only memory 33, one or more hard drives 34, and removable media 36 such as magnetic or optical disks.

Main processor 1 is coupled to chipset core logic 10 via bus 3. Chipset core logic 10 is coupled to memory 30 via bus 4. Chipset core logic 10 is further coupled to graphics processor 12 via bus 5, and it is coupled to the frame buffer 14 and to the Z-buffer 16 via bus 6. Frame buffer 14 and Z-buffer 16 are coupled to display monitor 18 via bus 7, and display monitor 18 is coupled to keyboard/mouse 20 via bus 8. Some of the connections illustrated in FIG. 1 are logical, rather than physical, connections for ease of illustration.

Other user interface elements, such as audio speakers, microphone, joy stick, steering wheel, printer, MIDI (musical instrument digital interface) keyboard, virtual reality devices, movable seat and environment, and the like can form a part of the data processing system but have not been illustrated in FIG. 1 for the sake of clarity. Likewise, additional peripheral devices, such as audio and video equipment, modems, network and other I/O (input/output) interfaces, and the like can also form a part of the data processing system, but they too have been omitted from FIG. 1, because it is known in the art how to utilize them in the broad spectrum of applications for which the data processing system can be employed.

While busses such as busses 3–8 are shown as single lines in FIG. 1, they ordinarily will be implemented as multiple conductors. Alternatively they can be implemented in any other suitable transmission medium, such as wireless or fiber optic technology.

The data processing system could include more or fewer processors than shown in FIG. 1. For example, the data processing system could function, although at a reduced level of performance, without graphics processor 12 and/or with the functions of frame buffer 14 and Z-buffer 16 being performed by a different memory and/or by main memory 32.

In one embodiment main processor 1 is an Intel® Pentium® III processor commercially available from Intel Corporation of Santa Clara, Calif. The graphics processor 12 is an nVIDIA GeForce 256 graphics accelerator commercially available from NVIDIA Corporation. The chipset core logic 10 is an Intel® 820 Series chipset commercially available from Intel Corporation.

Main memory 32 can be implemented in any suitable commercially available memory system. In one embodiment main memory is implemented with synchronous dynamic random access memory (SDRAM) devices as, for example, in an Intel® 440BX motherboard commercially available from Intel Corporation.

In one embodiment the computer software for implementing the motion-illusion functions of the inventive subject matter is embodied on an integrated circuit comprising at least one processor, such as main processor 1 and/or graphics processor 12. However, alternatively some of the motion-illusion computer software could reside in main processor 1, and some could reside in graphics processor 12. Alternatively, some or all of the motion-illusion software could reside in an appropriate part of memory 30. The term "computer-readable medium", as used herein, means any device, whether active or passive, containing computer instructions for instructing a processor, and/or containing computer data, such as a hard disk, floppy disk, compact disk (CD), random access memory (RAM), read only memory (ROM), cache memory, or the like.

The motion-illusion computer software can also be implemented by a different type of software module that can reside somewhere other than as described above and be executed by an execution unit (not shown) different from main processor 1 or graphics processor 12.

Figure 2:
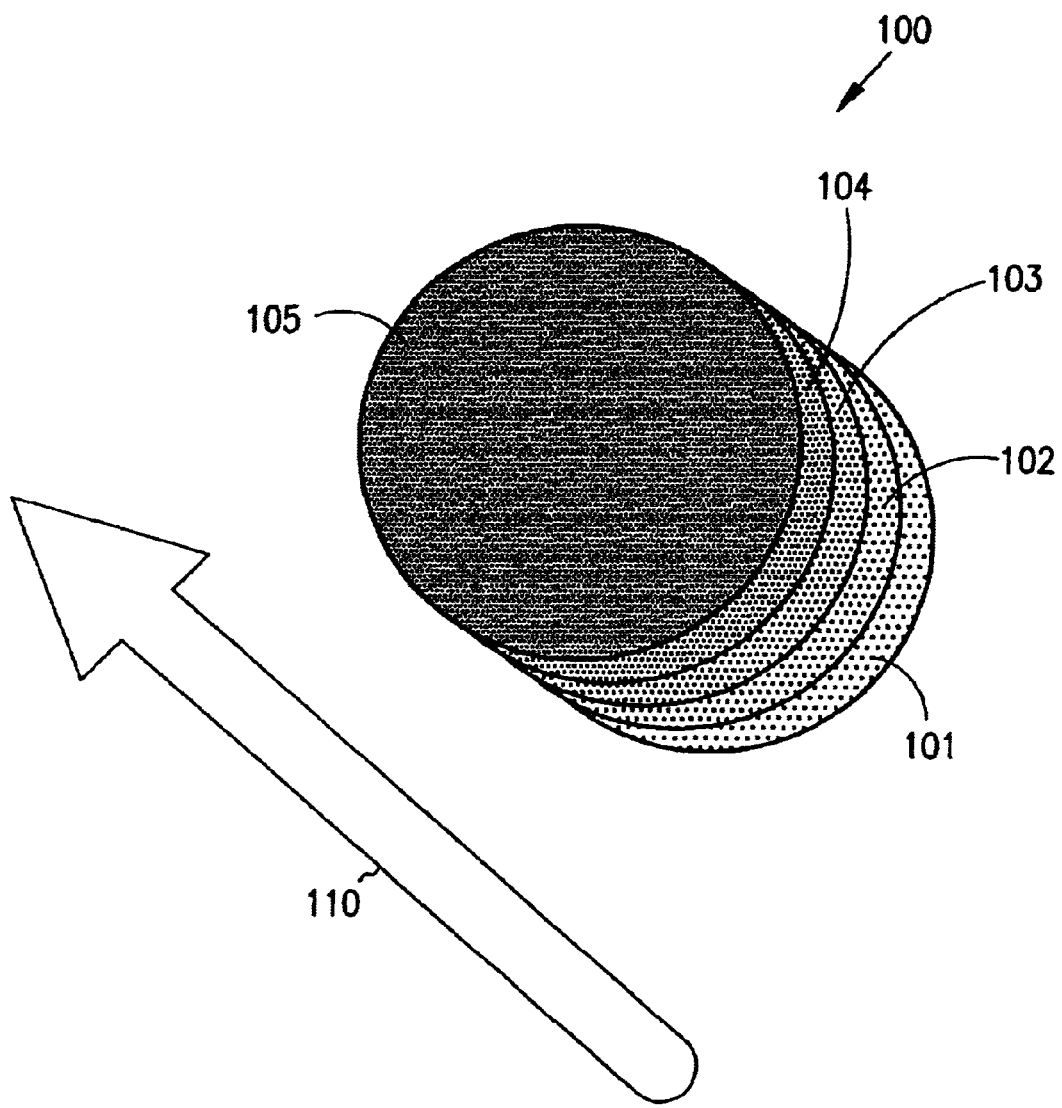
FIG. 2 depicts an example of motion illusion of a 3D object in a straight line, in accordance with one embodiment of the inventive subject matter.

FIG. 2 depicts an example of motion illusion of a 3D object 100 in a straight line, in accordance with one embodiment of the inventive subject matter. In FIG. 2 the 3D object is a sphere or ball 100, which is depicted as moving in the direction indicated by arrow 110. The ball 100 is displayed on the computer screen as a sequence of separate images or copies, starting with a first, faint image 101 that has a high "depth" attribute (described in the art and herein by the parameter "Z") and a high "transparency" attribute (described in the art and herein by the parameter "Alpha"), and ending with an intense image 105 that has minimal depth and transparency. The variation in the depth attribute is not readily seen from the isolated image of object 100 in FIG. 2 and would be more readily apparent in a scene that included some objects near object 100. The intermediate images 102–104 have proportionally decreasing depth and transparency according to one embodiment. The overall effect is to provide the viewer with an illusion of 3D motion of ball 100 in the direction of arrow 110.

Figure 3:
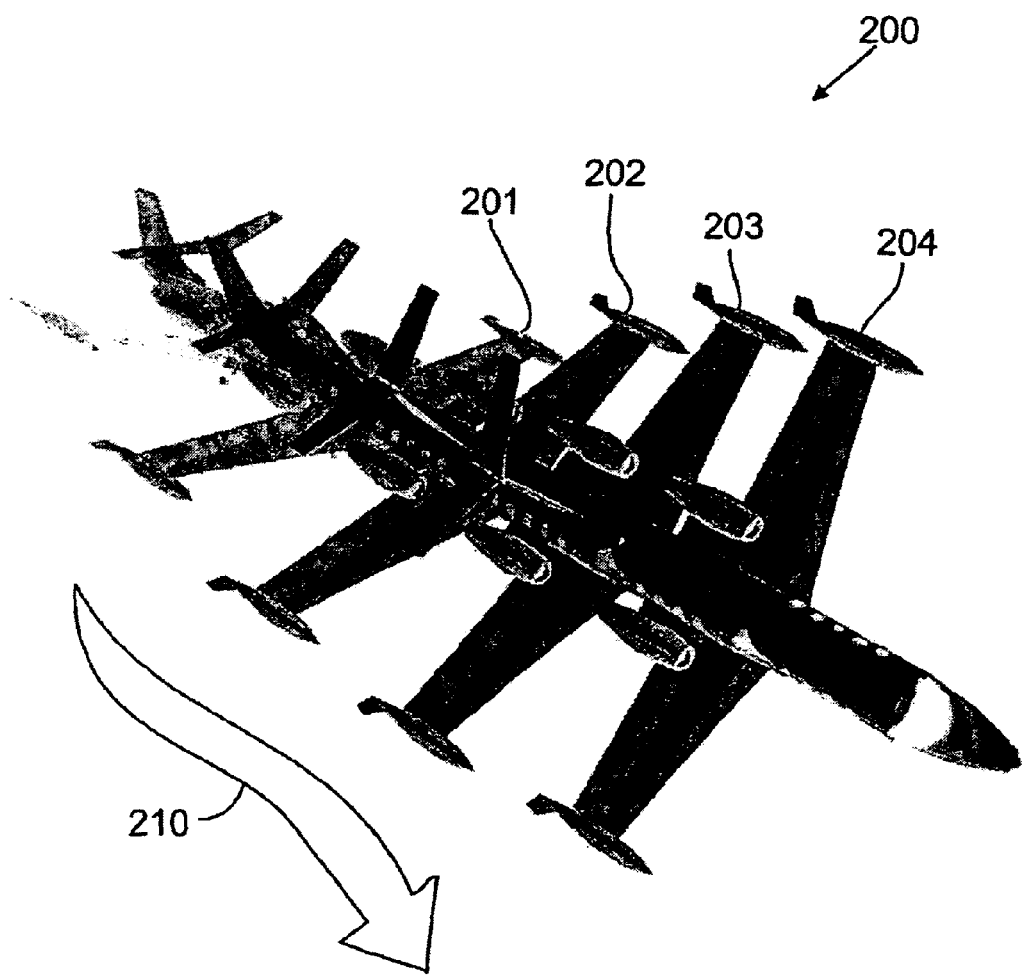
FIG. 3 depicts an example of motion illusion of a 3D object along a curved line, in accordance with another embodiment of the inventive subject matter.

FIG. 3 depicts an example of motion illusion of a 3D object along a curved line, in accordance with another embodiment of the inventive subject matter. In FIG. 3 the 3D object is an airplane 200, which is depicted as moving in the direction indicated by curving arrow 210. Airplane 200 is displayed on the computer screen as a sequence of four separate images, starting with a first, faint image 201 that has high depth and high transparency, and ending with an intense image 204 that has minimal depth and transparency. Again, the variation in the depth attribute is not readily seen from the isolated image of object 200 in FIG. 3 and would be more readily apparent in a scene that included some objects near object 200. The intermediate images 202 and 203 have proportionally decreasing depth and transparency according to one embodiment. The overall effect is to provide the viewer with an illusion of 3D motion of airplane 200 along the direction of curved arrow 210.

Figure 4:
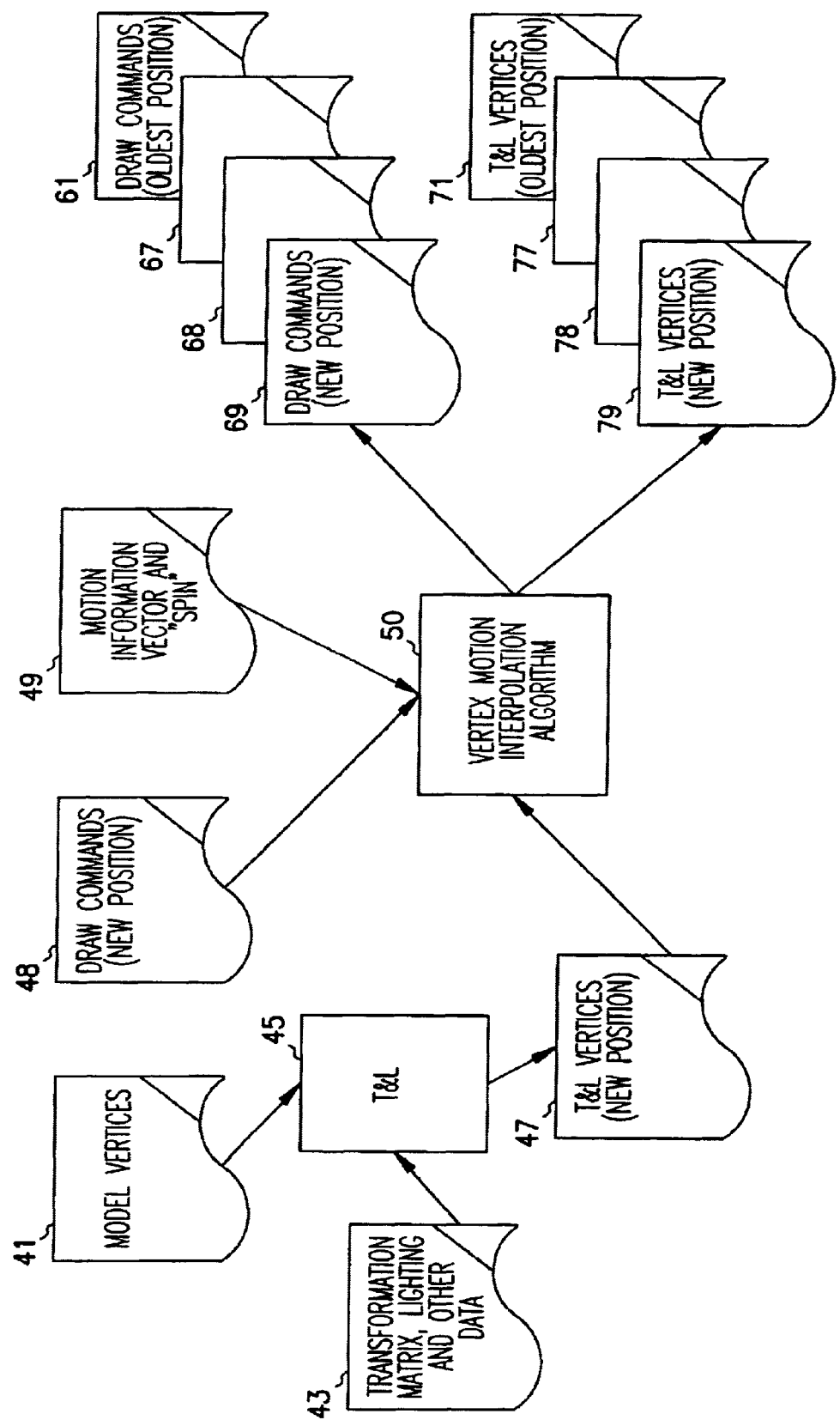
FIG. 4 illustrates a simplified schematic and flow diagram of a method of creating motion illusion of a 3D object in a graphics system, in accordance with one embodiment of the inventive subject matter.

FIG. 4 illustrates a simplified schematic and flow diagram of a method of creating motion illusion of a 3D object in a graphics system, in accordance with one embodiment of the inventive subject matter.

Before discussing FIG. 4 in detail, some background regarding the representation of 3D objects in a graphics system will be presented.

In order for a 3D object (e.g. ball 100 as illustrated in FIG. 2, or plane 200 as illustrated in FIG. 3) to be represented, manipulated, and displayed in a 3D graphics system, the system may include a computer data structure containing one or more data representations that describe the object.

Graphics scenes may contain many diverse types of 3D objects, and these objects may be represented in a diversity of ways. Many 3D objects can be represented by a set of surface polygons that enclose the object interior. Thus, many graphics systems store descriptions of 3D objects as sets of surface polygons (also referred to as "triangles"). A polygon surface can be specified mathematically by a set of vertex coordinates (indicating the size, shape, position, perspective, etc. of the polygon surface) and associated attributes (indicating color, intensity, transparency, depth, reflectivity, texture, fill, etc.).

Information for each polygon surface can be organized into at least two groups: "geometric data tables" and "attribute data tables". Geometric data tables comprise vertex coordinates and other geometric parameters, such as perspective data, that identify the spatial orientation of the polygon surfaces. Attribute data tables comprise parameters that specify, for example, the color, intensity, degree of transparency, fill pattern, surface reflectivity, texture, and other appearance characteristics of the 3D object.

As known in the art, in order for 3D graphics objects to be displayed on a two-dimensional screen, the input data representations are typically processed or transformed through several types of coordinate systems. For example, individual graphics objects can first be constructed and specified in "model space" using a coordinate system or reference frame called modeling coordinates or master coordinates.

The individual graphics objects can next be integrated into appropriate positions within a scene using a reference frame called "world space" or world coordinates. Next, the world-coordinate description of the scene can undergo clipping or culling of any polygons in the screen that are hidden from the viewer.

Finally, the clipped set of world-coordinates can be transferred to one or more reference frames for display on, for example, a two-dimensional screen such as display monitor 18. These display coordinate systems are referred to as device coordinates, or screen coordinates in the case of a display monitor. Using modeling coordinates and world coordinates allows the graphics programmer to use any suitable floating-point or integer dimensions without being constrained by the parameters of a particular output device.

Each of the above transformations may require fairly intensive mathematical processing of the plane equations that define the polygon surfaces using, for example, matrices and/or determinants to solve the equations for the particular type of coordinates, in a manner well known in the art. Various computer data structures are maintained in computer memory to describe a scene in terms of its constituent surface polygons or triangles, such as data tables containing information about the polygon vertices, polygon edges, polygon edge slopes, polygon bounding boxes, and so forth, as is known in the art. Included in these computer data structures is information referred to herein as transformation and lighting (T & L) vertices, referring generally to transformed geometric data and transformed attribute data.

It will also be understood that graphics processing may be performed on various groupings of polygons, such as primitives (i.e. groupings of triangles such as tri-strips and triangle fans), high-order surfaces such as polygon meshes (e.g. using the Multi-Resolution Mesh software technology commercially available from Intel Corporation), and so forth, and that the present inventive subject matter is not limited to a particular manner of graphics processing. If primitives are used, their motion can be represented using both a motion vector (direction of travel and magnitude) and data representing motion of the primitive on its axis (e.g. if it is spinning).

FIG. 4 will now be described in greater detail. In FIG. 4, one embodiment of the inventive subject matter is depicted in which an illusion of motion of a 3D object is achieved by using linear interpolation. Two additional embodiments will be discussed later.

In FIG. 4, block 50 performs a vertex motion interpolation algorithm that provides an illusion of motion to an object being displayed on display monitor 18. Block 50 receives inputs from blocks 47–49, and block 50 generates outputs to blocks 61 and 67–69, as well as to blocks 71 and 77–79.

In general, block 50 receives data relating to both old (i.e. initial or most transparent) and new (i.e. ending or least transparent) vertex positions of the object. Block 50 also receives draw commands relating to the new position of the object, and it receives motion information relating to the type of motion desired to impart to the object. Block 50 then generates a new set of draw commands 61 and 67–69 to the graphics system to draw a set of images, each representing the object in a slightly different depth, transparency, and/or color, for example, to give the illusion of 3D motion. Block 50 also generates a set of transformation and lighting (T & L) vertices 71 and 77–79 to the graphics system, thereby providing the T & L vertices for each image in the set of images to be drawn.

Block 41 provides the model vertices of the 3D object, i.e. the vertices from model space, to block 45, which performs transformation and lighting on the model vertices of the 3D object using the transformation matrix, lighting, and other data provided by block 43. T&L block 45 outputs T&L vertices 47 for the new position to vertex motion interpolation algorithm block 50.

Vertex motion interpolation algorithm block 50 is also responsive to block 48, which provides draw commands for the new position, and to block 49, which provides motion information, including both linear motion and spin motion.

In response to the inputs received from blocks 47–49, vertex motion interpolation algorithm block 50 generates a set of draw commands (block 61) for the oldest position of the 3D object, along with a corresponding set of T&L vertices (block 71) for the oldest position of the 3D object. Block 50 also generates a corresponding set of draw commands (block 69) and a set of T&L vertices (block 79) for the new position of the 3D object. In addition, block 50 generates corresponding sets of draw commands (blocks 67,68) and of T&L vertices (blocks 77,78) for several intermediate positions of the 3D object. The number N of images to be drawn is a matter of design optimization for the graphics programmer.

In one embodiment, the operation of vertex motion interpolation algorithm 50 can be summarized in a high-level manner by the following pseudo-code:
(1) For each vertex in all buffers,
(2) Begin
(3) Transform the vertex
(4) Light the vertex
(5) If this is a locked/optimized buffer,
(6) Begin
(7) Save a copy of the vertex
(8) If there is a prior copy of the vertex,
(9) Begin
(10) Determine difference in position (DeltaX, DeltaY, DeltaZ, DeltaW)
(11) Determine difference in colors (DeltaSpecularRed, DeltaDiffuseBlue, etc.).
(12) Determine difference in Alpha (MaxAlpha−NewAlpha)
(13) For I=1 to N (desired number of copies, increasing in the direction of the new, most intense object image),
(14) Begin
(15) Create a new vertex
(16) Set X position to the interpolated value: X=I*(DeltaX/N)+X
(17) Set Y position to the interpolated value: Y=I*(DeltaY/N)+Y
(18) Set Z position to the interpolated value: Z=I*(DeltaZ/N)+Z
(19) Set perspective to the interpolated value: W=I*(DeltaW/N)+W
(20) Set applicable colors to their interpolated values: RedSpec=I*(DeltaRedSpec/N)+RedSpec, etc.
(21) Set transparency to the interpolated value: NewAlpha=MaxAlpha−(DeltaAlpha/N)*(I−1)
(22) End
(23) End
(24) End
(25) End Line (1) of the pseudo-code states that the operations described will be performed for each polygon vertex in the scene. In line (3) the vertex is transformed from model coordinates to device coordinates, and in line (4) the vertex is lit by having any applicable attribute data (e.g., color, intensity, transparency, depth, fill, surface reflectivity, texture, etc.) applied to it.

The code following line (5) will be performed if this buffer is locked and optimized, i.e. if this buffer will be reused. In line (7) a copy of the vertex is saved. The code following line (8) will be performed if there is a prior copy of the vertex.

In line (10) the differences between the new and old positions of the vertex are determined by calculating DeltaX, DeltaY, DeltaZ, and DeltaW. DeltaX, for example, is the difference in the X coordinates for the final position of the object and the original position of the object to be depicted on the screen. DeltaY and DeltaZ are the differences in the Y and Z coordinates, and DeltaW is the difference in the W, or perspective, coordinate.

In line (11) the differences in all applicable colors between the new and old positions are determined by calculating the appropriate Delta for each applicable color. In line (12) the difference in transparency (Alpha) is determined between the new and old positions, wherein NewAlpha represents the minimal amount of transparency for the new position, and MaxAlpha represents the maximum amount of transparency for the old position. The graphics programmer can select a value for MaxAlpha that is optimum for the particular object being displayed.

The code following line (13) will be performed for N iterations, where N is the number of images or copies of the 3D object that are displayed, and wherein I increases in the direction of the new, most intense object image.

The code following line (15) is used to create a new vertex. In line (16) the new X position is set to the interpolated value, i.e. new X=I*(DeltaX/N)+old X. Similarly, in lines (17) and (18) the new Y and Z positions are set to the interpolated values.

In line (19) the new perspective W is set to the interpolated value. In line (20) each of the applicable colors is set to its respective interpolated value. In line (21) the transparency Alpha is set to its interpolated value, with the Alpha value diminishing from its maximum at the oldest, most transparent image in the direction of the newest, least transparent image. In addition to, or instead of, the attributes of color and transparency, other attribute-specific parameters, such as intensity, reflectivity, fill, and texture can be utilized to impart the desired effect of 3D motion to the object being displayed.

Further, interpolated values of certain geometric parameters, such as size, position including depth, and the like, can be applied to the sequence of images, instead of or in addition to interpolated values of the above-mentioned attributes of color, transparency, intensity, reflectivity, fill and texture to impart a desired illusion of motion. As used herein, the term "attribute" includes color, transparency, intensity, reflectivity, fill, and texture, as well as geometric parameters such as size, position including depth, and the like. Thus, for example, a 3D object can be given an illusion of motion by varying only the size or the depth of the object from the old position through the intermediate positions to the new position, or by using a combination of size, depth, and intensity. Attributes can be utilized singly or in any combination to achieve the desired effect.

The above-described embodiment, which performs a linear interpolation of polygon vertex and attribute information, can be implemented without changing the particular graphics application and with relatively low computational demands. This interpolative method is suitable for many graphics applications where it is desired to provide the viewer with the illusion of motion of a 3D object. The accuracy of the motion representation holds for rotations that are less than or equal to about one-quarter rotation per frame, because higher rotation may distort the object's image.

This embodiment can be implemented using, for example, application programmer's interfaces (API's) for a commercially available 3D library, such as Direct3D, available from Microsoft Corporation. Using Direct3D, the programmer can use an "optimize" or "locking" tag on a vertex buffer (refer to line (5) of the above pseudo-code). This tag is used by the application or scene manager to indicate that the buffer will be reused without changes to the source vertices. After an "optimized" vertex list has been transformed and lit, the results are saved. If a prior result exists, the motion of each vertex is determined, and N copies of each vertex are created, going back to the origin of the position of the object with increasing transparency (Alpha). The 3D object is drawn at each of the desired number N of positions using these vertices.

The interpolation calculations (e.g. using floating-point matrices) required by this embodiment of the inventive subject matter are particularly well performed using the streaming SIMI instructions provided in the instruction set for the Pentium® III microprocessor. Although such calculations do not significantly increase the microprocessor's workload, significantly more polygons are delivered to the display hardware.

As mentioned earlier, the inventive subject matter can also be implemented in various alternative embodiments. In one alternative embodiment, an illusion of motion of a 3D object is achieved by using a fitting function to derive the motion and rotation of the object from its old and new positions. In essence, the transformation matrix that is used for both the object's old and new position is analyzed. This transformation matrix includes several elements computed into it, including scaling, shift, movement, and rotation. By looking at the movement of more than one vertex in the object, and performing some basic geometric calculations, values for each of these elements can be derived. Scaling, shift, and movement are relatively easily derived, because they affect all vertices in an object. Deriving rotation is relatively more difficult, because it depends upon where the vertices are in the object in relation to the axis of rotation, but after the other elements are known, all that is needed to derive rotation is to identify the angle and axis of rotation which fits all of the vertices of the object. This embodiment can be implemented without changing the particular graphics application and with only medium-level computational demands. The accuracy of the motion representation produced by this embodiment is particularly suitable when the object rotation is on a single axis and involves no more than one rotation.

In another alternative embodiment, an illusion of motion of a 3D object is achieved by having the graphics application itself specify the desired position of the object at each time frame. The graphics application generates a plurality of matrices to describe the 3D object's actual motion. By making suitable changes to the vertex motion interpolation algorithm 50, the generated matrices are used to create a desired number of images of the 3D object lying between the old position and the new position, using a new matrix for each object, or reusing a matrix if, for example, the object is to remain momentarily in one position. This embodiment provides the most accurate rendering of the object's motion between the old position and the new position, and it can accurately depict rotation or spinning of the object without limitation as to the number of rotations. While it requires only medium-level computational demands, it does require modifications to the code of the particular graphics application.

In order to implement any of the above-described embodiments of the inventive subject matter, various data structures are stored in one or more memory components of the data processing system illustrated in FIG. 1. One data structure comprises a first block of data regarding a first set of vertices or primitives for a first position of an object on a computer screen. The data structure also comprises a second block of data regarding a second set of vertices or primitives for a second position of the object on the computer screen. The second block additionally includes attribute data that causes the object in the second position to appear different from the object in the first position, in a manner that provides the object with an illusion of 3D motion between the first position and the second position.

The data structure can comprise third and subsequent blocks of data regarding third and subsequent vertices or primitives for third and subsequent positions of the object on the computer screen. This could be, for example, for the purpose of rendering the object in a plurality of intermediate positions between the first and second position, with the object having a different value of one or more types of attribute data at each intermediate position. The third and subsequent blocks of data can thus each include a different value of the attribute data that causes the object in the corresponding positions to appear different from the object in the other positions, again in a manner that provides the object with an illusion of 3D motion between the first and second positions on the computer screen.

Conclusion

In conclusion, the inventive subject matter presents a simple, realistic, and effective method and apparatus for creating 3D motion illusion in a graphics system. The linear interpolation embodiment is simple enough for low cost hardware implementation yet realistic and effective enough to give significant performance improvement in animating the movement of objects.

The disclosed inventive subject matter can be modified in numerous ways and can assume many embodiments other than those specifically set out and described above. For example, while the inventive subject matter has been described with reference to the representation of 3D objects using polygons, the inventive subject matter can equally be implemented using other representation schemes, such as quadric surfaces, superquadrics, spline surfaces, fractal and particle systems, blobby objects, octree systems, iso-surface displays, volume renderings, sweep representations, and other visualization techniques.

In addition, the inventive subject matter can be implemented by any suitable processor or other type of computational circuit, such as but not limited to a microprocessor, a microcontroller, a complex instruction set computing (CISC) microprocessor, a reduced instruction set computing (RISC) microprocessor, a very long instruction word (VLW) microprocessor, a graphics processor, a digital signal processor, an application-specific integrated circuit (ASIC), or any other type of processor or processing circuit, or combination thereof.

Moreover, the inventive subject matter is not limited to display on a computer screen but can be implemented on any output display device, such as a plotter, printer, flat-panel display, liquid crystal display, plasma panel, photographic film, hologram, virtual reality display, 3D display device, or the like.

The inventive subject matter may be embodied in other specific forms without departing from the spirit or essential characteristics thereof. The present embodiments are therefore to be considered in all respects as illustrative and not restrictive, the scope of the inventive subject matter being indicated by the appended claims rather than by the foregoing description, and all changes which come within the meaning and range of equivalency of the claims are therefore intended to be embraced therein.

What is claimed is:

1. A method adapted to be used in a processor and comprising:
   generating a first set of vertex data representing an object to be displayed in a first position on a computer screen;
   generating a second set of vertex data representing the object to be displayed in a second position on the computer screen;
   applying at least one attribute to one of the sets of vertex data, and wherein the at least one attribute is from the group cosisting of transparecy, color, intensity, reflectivity, fill, and texture; and
   processing the first and second sets of vertex data for display of the object in the first and second positions on the computer screen, the at least one attribute causing the object in the first position to appear different from the object in the second position in a manner that provides the object with an illusion three-dimensional of motion between the first position and the second position.

2. The method recited in claim 1 wherein the first and second sets of vertex data comprise vertex data from the group consisting of geometric data and perspective data.

3. The method recited in claim 1 and further comprising:
   generating at least one additional set of vertex data representing the object to be displayed in at least one additional position on the computer screen;
   applying a different value of the at least one attribute to the at least one additional set of vertex data; and
   processing the at least one additional set of vertex data for display of the object in the at least one additional position on the computer screen while displaying the different value of the at least one attribute.

4. A method adapted to be used in a data processing system and comprising:
   generating a first set of vertex data representing an object to be displayed in a first position on a computer screen;
   generating a second set of vertex data representing the object to be displayed in a second position on the computer screen;
   applying first values of transparency and depth to one of the sets of vertex data; and
   rendering the first and second sets of vertex data to display the object in the first and second positions on the computer screen, the first values causing the causing the object in the first position to appear different from the object in the second position in a manner that provides the object with an illusion of three-dimensional motion between the first position and the second position.

5. The method recited in claim 4 wherein the first and second sets of vertex data comprise vertex data from the group consisting of geometric data and perspective data.

6. The method recited in claim 4 and further comprising:
   generating at least one additional set of vertex data representing the object to be displayed in at least one additional position on the computer screen;
   applying second values of transparency and depth to the at least one additional set of vertex data; and
   rendering the at least one additional set of vertex data to display the object in the at least one additional position on the computer screen while displaying the second values transparency and depth.

7. The method recited in claim 6 wherein at least one of the sets of vertex data is generated by an interpolative process.

8. The method recited in claim 6 wherein at least one of the sets of vertex data is generated by a curve-fitting process.

9. The method recited in claim 6 wherein at least two of the sets of vertex data are generated by a graphics application specifying desired positions of the object.

10. The method recited in claim 4 wherein, in addition to the first values, at least one attribute from the group consisting of color, intensity, reflectivity, fill, and texture is applied to the one set of vertex data.

11. The method recited in claim 4 wherein the operations are performed in the order recited.

12. A processor executing a computer program comprising the operations of:
    generating a first set of vertex data representing an object to be displayed in a first position on a computer screen;
    generating a second set of vertex data representing the object to be displayed in a second position on the computer screen;
    applying the first values of transparency, color, and depth to one of the sets of vertex data; and
    processing the first and second sets of vertex data for display of the object in the first and second positions on the computer screen, the first values of transparency, color, and depth causing the object in the first position to appear different from the object in the second position in a manner that provides the object with an illusion of three-dimensional motion between the first position and the second position.

13. The processor recited in claim 12 wherein the first and second sets of vertex data comprise vertex data from the group consisting of geometric data and perspective data.

14. The processor recited in claim 12 wherein the computer program further comprises the operations of:
generating at least one additional set of vertex data representing the object to be displayed in at least one additional position on the computer screen;
applying second values of transparency, color, and depth to the at least one additional set of vertex data; and
processing the at least one additional set of vertex data for display of the object in the at least one additional position on the computer screen while displaying the second values of transparency, color, and depth.

15. The processor recited in claim 12 wherein, in addition to the first values, at least one attribute from the group consisting of intensity, reflectivity, fill, and texture is applied to the one set of vertex data.

16. A data processing system comprising a computer screen and a processor, the processor executing a computer program comprising the operations of:
generating a first set of vertex data representing an object to be displayed in a first position on the computer screen;
generating a second set of vertex data representing the object to be displayed in a second position on the computer screen;
applying first values of transparency and depth to one of the sets of vertex data; and
rendering the first and second sets of vertex data to display the object in the first and second positions on the computer screen, first values of transparency and depth causing the object in the first position to appear different from the object in the second position in a manner that provides the object with an illusion of three-dimensional motion between the first position and the second position.

17. The data processing system recited in claim 16 wherein the first and second sets of vertex data comprise vertex data from the group consisting of geometric data and perspective data.

18. The data processing system recited in claim 16 wherein the computer program further comprises the operations of:
generating at least one additional set of vertex data representing the object to be displayed in at least one additional position on the computer screen;
applying second values to transparency and depth to the at least one additional set of vertex data; and
rendering the at least one additional set of vertex data to display the object in the at least one additional position on the computer screen while displaying the second values of transparency and depth.

19. The data processing system recited in claim 18 wherein at least one of the sets of vertex data is generated by an interpolative process.

20. The data processing system recited in claim 18 wherein at least one of the sets of vertex data is generated by a curve-fitting process.

21. The data processing system recited in claim 18 wherein at least two of the sets of vertex data are generated by a graphics application specifying desired positions of the object.

22. The data processing system recited in claim 16 wherein, in addition to the first values, at least one attribute from the group consisting of color, intensity, reflectivity, fill, and texture is applied to the one set of vertex data.

23. The data processing system recited in claim 16 wherein the operations are executed by the processor in the order recited.

24. A computer-readable medium containing computer-executable instructions for instructing a processor to perform a method of providing an illusion of motion to an object displayed on a computer screen, the instructions comprising:
generating a first set of vertex data representing the object in a first position on the computer screen;
generating a second set of vertex data representing the object to be displayed in a second position on the computer screen;
applying first values of transparency, color, intensity, reflectivity, fill, and texture to one of the sets of vertex data; and
rendering the first and second sets of vertex data to display the object in the first and second positions on the computer screen, the first values of transparency, color, intensity, reflectivity, fill, and texture causing the object in the first position to appear different from the object in the second position in a manner that provides the object with the illusion of three-dimensional motion between the first position and the second position.

25. The computer-readable medium recited in claim 24 wherein the instructions further comprise:
generating at least one additional set of vertex data representing the object to be displayed in at least one additional position on the computer screen;
applying second values of transparency, color, intensity, reflectivity, fill and texture to the at least one additional set of vertex data; and
rendering the at least one additional set of vertex data to display the object in the at least one additional position on the computer screen while displaying the second values of transparency, color, intensity, reflectivity, fill, and texture.

26. A computer-readable medium having stored thereon a data structure comprising:
a first block of vertex data representing an object to be rendered in a first position on a computer screen; and
a second block of vertex data representing the object to be rendered in a second position on the computer screen, the second block further comprising attribute data that causes the object in the second position to appear different from the object in the first position, in a manner that provides the object with an illusion of three-dimensional motion between the first position and the second position, wherein the attribute data consists of transparency, color, texture, and depth.

27. The computer-readable medium recited in claim 26, wherein the data structure further comprises:
a third block of vertex data representing the object to be rendered in a third position on the computer screen, the third block further comprising attribute data having a different value from that of the second block, causing the object in the third position to appear different from the object in the first and second positions, in a manner that provides the object with an illusion of motion between the first position and the second position.

28. The computer-readable medium recited in claim 26 wherein the first and second blocks of vertex data comprise vertex data from the group consisting of geometric data and perspective data.

29. A method comprising:
   generating a first set of vertex data representing an object to be displayed in a first position on a display;
   generating a second set of vertex data representing the object to be displayed in a second position on the display;
   applying first values of transparency and color to one of the sets of vertex data; and
   rendering the first and second sets of vertex data to display the object in the first and second positions on the display, the first values causing the object in the first position to appear different from the object in the second position in a manner that provides the object with an illusion of three-dimensional motion between the first position and the second position.

30. The method recited in claim 31, wherein the first and second sets of vertex data comprise vertex data selected from the group consisting of geometric data and perspective data.

31. The method recited in claim 29, and further comprising:
   generating at least one additional set of vertex data representing the object to be displayed in at least one additional position on the display;
   applying second values of transparency and color to the at least one additional set of vertex data; and
   Rendering the at least one additional set of vertex data to display th object in the at least one additional position on the display while displaying the second values of transparency and color.

32. The method recited in claim 31, wherein at least one of the sets of vertex data is generated by an interpolative process.

33. The method recited in claim 31, wherein at least one of the sets of vertex data is generated by a curve-fitting process.

34. The method recited in claim 31, wherein at least two of the sets of vertex data are generated by a graphics application specifying desired positions of the object.

35. The method recited in claim 29 wherein, in addition to the first values, at least one attribute from the group consisting of intensity, reflectivity, fill, and texture is applied to the one set of vertex data.

36. The method recited in claim 29, wherein the operations are performed in the order recited.

* * * * *

UNITED STATES PATENT AND TRADEMARK OFFICE
CERTIFICATE OF CORRECTION

| | |
|---|---|
| PATENT NO. | : 6,847,364 B1 |
| APPLICATION NO. | : 09/471984 |
| DATED | : January 25, 2005 |
| INVENTOR(S) | : Dichter |

It is certified that error appears in the above-identified patent and that said Letters Patent is hereby corrected as shown below:

In column 9, line 45, in Claim 1, after "method" delete "adapted".

In column 9, line 45, in Claim 1, after "data," delete "and".

In column 9, line 55, in Claim 1, delete "cosisting" and insert -- consisting --, therefor.

In column 9, line 55, in Claim 1, delete "transparecy" and insert -- transparency --, therefor.

In column 9, line 62, in Claim 1, after "illusion" insert -- of --.

In column 9, line 63, in Claim 1, delete "of" before "motion".

In column 10, line 11, in Claim 4, after "method" delete "adapted".

In column 10, lines 23-24, in Claim 4, delete "causing the" before "object".

In column 10, line 41, in Claim 6, after "values" insert -- of --.

In column 10, line 64, in Claim 12, after "applying" delete "the".

In column 11, line 39, in Claim 16, after "screen," insert -- the --.

In column 11, line 56, in Claim 18, after "values" delete "to" and insert -- of --, therefor.

In column 12, line 42, in Claim 25, after "fill" insert -- , --.

UNITED STATES PATENT AND TRADEMARK OFFICE
CERTIFICATE OF CORRECTION

PATENT NO. : 6,847,364 B1
APPLICATION NO. : 09/471984
DATED : January 25, 2005
INVENTOR(S) : Dichter It is certified that error appears in the above-identified patent and that said Letters Patent is hereby corrected as shown below:

In column 13, line 26, in Claim 30, delete "claim 31," and insert -- claim 29, --, therefor.

In column 14, line 1, in Claim 31, after "claim 29" delete ",".

In column 14, line 9, in Claim 31, delete "Rendering" and insert -- rendering --, therefor.

In column 14, line 10, in Claim 31, delete "th" and insert -- the --, therefor.

Signed and Sealed this

Twenty-fifth Day of March, 2008

JON W. DUDAS
*Director of the United States Patent and Trademark Office*